(12) United States Patent
Horvitz

(10) Patent No.: US 7,831,532 B2
(45) Date of Patent: Nov. 9, 2010

(54) PRECOMPUTATION AND TRANSMISSION OF TIME-DEPENDENT INFORMATION FOR VARYING OR UNCERTAIN RECEIPT TIMES

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1364 days.

(21) Appl. No.: 11/171,063

(22) Filed: Jun. 30, 2005

(65) Prior Publication Data

US 2006/0106599 A1    May 18, 2006

Related U.S. Application Data

(60) Provisional application No. 60/628,267, filed on Nov. 16, 2004.

(51) Int. Cl.
*G06F 17/00* (2006.01)
*G06N 5/00* (2006.01)
(52) U.S. Cl. ........................................... 706/45
(58) Field of Classification Search ................ 706/45
See application file for complete search history.

(56) References Cited

U.S. PATENT DOCUMENTS

| | | | |
|---|---|---|---|
| 5,375,059 A | 12/1994 | Kyrtsos et al. | |
| 5,493,692 A | 2/1996 | Theimer et al. | |
| 5,541,590 A | 7/1996 | Nishio | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,751,245 A | 5/1998 | Janky et al. | |
| 5,812,865 A | 9/1998 | Theimer et al. | |
| 5,945,985 A | 8/1999 | Babin et al. | |
| 6,256,577 B1 | 7/2001 | Graunke | |
| 6,317,686 B1 | 11/2001 | Ran | |
| 6,321,158 B1 | 11/2001 | DeLorme et al. | |
| 6,353,398 B1 | 3/2002 | Amin et al. | |
| 6,360,168 B1 | 3/2002 | Shimabara | |
| 6,401,027 B1 * | 6/2002 | Xu et al. ...................... 701/117 | |

(Continued)

FOREIGN PATENT DOCUMENTS

DE    10057796 A1    5/2002

(Continued)

OTHER PUBLICATIONS

Andy Harter, et al., A Distributed Location System for the Active Office, IEEE Network, 1994, pp. 62-70.

(Continued)

*Primary Examiner*—Donald Sparks
*Assistant Examiner*—Li-Wu Chang
(74) *Attorney, Agent, or Firm*—Wolf, Greenfield & Sacks, P.C.

(57) ABSTRACT

A system that facilitates analyzing time-related data comprises an interface component that receives a packet of information that includes a plurality of predictions and timing information associated therewith. A time-analysis component communicatively coupled to the interface component compares the timing information associated with the plurality of predictions with a current time and makes a determination relating to output of at least one of the plurality of predictions based at least in part upon the comparison.

19 Claims, 14 Drawing Sheets

U.S. PATENT DOCUMENTS

| | | | |
|---|---|---|---|
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,672,506 B2 | 1/2004 | Swartz et al. | |
| 6,735,549 B2 | 5/2004 | Ridolfo | |
| 6,741,188 B1 | 5/2004 | Miller et al. | |
| 6,747,675 B1 | 6/2004 | Abbott et al. | |
| D494,584 S | 8/2004 | Schlieffers et al. | |
| 6,785,606 B2 | 8/2004 | DeKock et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,813,555 B1 | 11/2004 | Kerner | |
| 6,837,436 B2 | 1/2005 | Swartz et al. | |
| 6,842,877 B2 | 1/2005 | Robarts et al. | |
| 6,879,969 B2 | 4/2005 | Engstrom et al. | |
| 6,938,203 B1 | 8/2005 | Dimarco et al. | |
| 7,006,866 B1 | 2/2006 | Deco et al. | |
| 7,010,501 B1 | 3/2006 | Roslak et al. | |
| 7,012,614 B2 | 3/2006 | Chalfin et al. | |
| 7,040,541 B2 | 5/2006 | Swartz et al. | |
| 7,063,263 B2 | 6/2006 | Swartz et al. | |
| 7,069,258 B1 | 6/2006 | Bothwell | |
| 7,098,805 B2 | 8/2006 | Meadows et al. | |
| 7,103,470 B2 | 9/2006 | Mintz | |
| 7,149,716 B2 * | 12/2006 | Gatto | 705/36 R |
| 7,171,378 B2 | 1/2007 | Petrovich et al. | |
| 7,195,157 B2 | 3/2007 | Swartz et al. | |
| 7,317,449 B2 | 1/2008 | Robbins et al. | |
| 7,385,501 B2 | 6/2008 | Miller et al. | |
| 7,610,560 B2 | 10/2009 | Horvitz et al. | |
| 7,698,055 B2 | 4/2010 | Horvitz et al. | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0026278 A1 | 2/2002 | Feldman et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0082767 A1 * | 6/2002 | Mintz | 701/117 |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0009270 A1 | 1/2003 | Breed | |
| 2003/0046401 A1 | 3/2003 | Abbott et al. | |
| 2003/0069683 A1 | 4/2003 | Lapidot et al. | |
| 2003/0154476 A1 | 8/2003 | Abbott, III et al. | |
| 2004/0098194 A1 | 5/2004 | Baur et al. | |
| 2004/0122702 A1 | 6/2004 | Sabol et al. | |
| 2004/0201500 A1 | 10/2004 | Miller et al. | |
| 2004/0257440 A1 | 12/2004 | Kondo et al. | |
| 2005/0034078 A1 | 2/2005 | Abbott et al. | |
| 2005/0065711 A1 | 3/2005 | Dahlgren et al. | |
| 2005/0090938 A1 | 4/2005 | Ranelli | |
| 2005/0108322 A1 * | 5/2005 | Kline et al. | 709/203 |
| 2005/0266858 A1 | 12/2005 | Miller et al. | |
| 2005/0272442 A1 | 12/2005 | Miller et al. | |
| 2006/0019676 A1 | 1/2006 | Miller et al. | |
| 2006/0089787 A1 | 4/2006 | Burr et al. | |
| 2006/0103674 A1 | 5/2006 | Horvitz et al. | |
| 2006/0106530 A1 | 5/2006 | Horvitz et al. | |
| 2008/0090591 A1 | 4/2008 | Miller et al. | |
| 2008/0091537 A1 | 4/2008 | Miller et al. | |
| 2008/0161018 A1 | 7/2008 | Miller et al. | |
| 2010/0053154 A1 | 3/2010 | Horvitz et al. | |

FOREIGN PATENT DOCUMENTS

| | | |
|---|---|---|
| DE | 10063763 A1 | 7/2002 |
| DE | 10110549 A1 | 9/2002 |
| DE | 102004015880 A1 | 11/2004 |
| DE | 10336590 A1 | 2/2005 |
| WO | 9800787 | 1/1998 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36-No. 7.

Roy Want, et al., The Active Badge Location System, ACM Transactions on Information Systems, Jan. 1992, pp. 91-102, vol. 10-No. 1.

Mark Weiser, Some Computer Science Issues in Ubiquitous Computing, Communications of the ACM, Jul. 1993, pp. 75-84, vol. 36-No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8-No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

S.D. Bay, et al. (1999). Detecting Change in Categorical Data: Mining Contrast Sets. Knowledge Discovery and Data Mining, pp. 302-499.

D.M. Chickering, et al. (1997). A Bayesian approach to learning Bayesian networks with local structure. In Proceedings of Thirteenth Conference on Uncertainty in Artificial Intelligence, 80-89.

D. Heckerman, et al. (1995). Learning Bayesian Networks: A Unification for Discrete and Gaussian Domains. Proceedings of UAI 95, pp. 274-284.

Horvitz, et al. (1995) Display of Information for Time-Critical Decision Making. Proceedings of the Eleventh Conference on Uncertainty in Artificial Intelligence. Morgan Kaufmann Publishers, 296-305.

M. Meek, et al. (2002). Staged Mixture Modeling and Boosting. Proceedings of the UAI 2002, pp. 335-343.

U. Nodelman, et al. Continuous Time Bayesian Networks for Inferring Users' Presence and Activities with Extensions for Modeling and Evaluation, Microsoft Research Technical Report MSR-TR-2003-97, Dec. 2003.

U. Nodelman, et al. (2003). Learning Continuous Time Bayesian Networks. Proceedings of UAI 2003, pp. 451-458.

D. Robbins, et al. (2004). ZoneZoom: Map Navigation with Smartphones with Recursive View Segmentation, Advanced Visual Interfaces, AVI 2004, Gallipoli, Italy, May 2004.

N. Vandaele, et al. (2000). A Queuing-Based Traffic Flow Model. Transportation Research-D: Transportation and Environment, 5(2), pp. 121-135.

W. Wong, et al. (2003). Bayesian Network Anomaly Pattern Detection for Disease Outbreaks, ICML 2003: 808-815.

International Search Report dated Jan. 11, 2007 for International Patent Application No. PCT/US 06/25167, 3 pgs.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Pawan Lingras, et al. "Traffic Volume Time-Series Analysis According to the Type of Road Use" Computer-Aided Civil and Infrastructure Engineering, Blackwell Publishers, 350 Main Street, Malden, MA 02148, 9 pages.

European Search Report dated Apr. 26, 2007 for European Patent Application Serial No. 05 10 9793, 2 Pages.

OA dated Oct. 3, 2008 for U.S. Appl. No. 11/165,070, 11 pages.

OA dated Aug. 13, 2008 for U.S. Appl. No. 11/172,581, 33 pages.

* cited by examiner

PRECOMPUTATION AND TRANSMISSION OF TIME-DEPENDENT INFORMATION FOR VARYING OR UNCERTAIN RECEIPT TIMES

REFERENCE TO RELATED APPLICATIONS

This application claims the benefit of U.S. Provisional Application Ser. No. 60/628,267 filed on Nov. 16, 2004, and entitled SYSTEM AND METHOD FOR PREDICTION AND PRESENTATION OF ATYPICAL EVENTS. This application is also related to U.S. Pat. No. 7,519,564, issued Apr. 14, 2009, entitled BUILDING AND USING PREDICTIVE MODELS OF CURRENT AND FUTURE SURPRISES; U.S. Pat. No. 7,610,560, issued Oct. 27, 2009, entitled METHODS FOR AUTOMATED AND SEMIAUTOMATED COMPOSITION OF VISUAL SEQUENCES, FLOWS, AND FLYOVERS BASED ON CONTENT AND CONTEXT; and U.S. Pat. No. 7,698,055, issued Apr. 13, 2010, entitled TRAFFIC FORECASTING EMPLOYING MODELING AND ANALYSIS OF PROBABILISTIC INTERDEPENDENCIES AND CONTEXTUAL DATA. The entireties of these applications are incorporated herein by reference.

BACKGROUND

Electronic storage mechanisms have enabled accumulation of massive amounts of data. For instance, data that previously required volumes of books for recordation can now be stored electronically without expense of printing paper and with a fraction of space needed for storage of paper. In one particular example, deeds and mortgages that were previously recorded in paper volumes can now be stored electronically. Moreover, advances in sensors and other electronic mechanisms now allow massive amounts of data to be collected and stored. For instance, Global Positioning Systems (GPS) can determine location of an individual or entity by way of satellites and GPS receivers, and electronic storage devices connected thereto can then be employed to retain locations associated with such systems. Various other sensors and data collection devices can also be utilized for obtainment and storage of data.

Collected data relating to particular contexts and/or applications can be employed in connection with data trending and analysis, and predictions can be made as a function of received and analyzed data. Such prediction is, in fact, human nature, and individuals frequently generate such predictions. For instance, a person traveling between a place of employment and a place of residence can determine that during certain times of day within weekdays, traffic conditions are subject to high levels of congestion. Thus, prior to leaving a place of work, an individual can predict when and where they will most likely be slowed in traffic, and can further predict how long they will be subject to congestion. The individual's predictions can further be a function of other variables, such as whether a day is a holiday, events that are geographically proximate, weather, and the like. Therefore, when an individual has access to contextual information and has access to (e.g., by way of memory) historical data, the individual can generate predictions.

Predictive models utilized on computer systems can often produce more accurate predictive results than a human, as computer systems may have access to a substantial amount of data. For instance, a computer application can have access to data that represents traffic patterns over twenty years, whereas an individual may have experienced traffic patterns for less than a year. These predictive models can be quite effective when generating predictions associated with common occurrences. Computer-implemented predictive models reliant upon substantial amounts of contextual data, however, can be associated with various deficiencies and/or problems with timely receiving data. For instance, a predictive model can be tasked to predict events and/or circumstances that will occur in approximately thirty minutes. It may be the case, however, that data received by a predictive model from one or more sensors can be subject to delays that are near thirty minutes (e.g., caused by delays in getting data from a sensor to various amplifying mechanisms or holding stations, to a server that retains a predictive model, ... ). Furthermore, there may be uncertain delays in getting predictive data from the model (which can reside in a server) to a device associated with a user (e.g., a wristwatch, a personal digital assistant, a cellular phone, ... ). These delays can be associated with bandwidth issues, lack of processing power in a server, physical impediments between a user and a communicating base station, etc. Thus, given the uncertainty in delay of data, a user's experience can be negatively affected because outdated information is provided to such user and/or data not as relevant to the user as disparate data is provided to the user.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to systems and methods for associating time information with predictive data and thereafter analyzing such time information to determine output parameters associated with the predictive data. For example, time information can be analyzed to determine a time that predictive data is to be output to a user, a manner in which to output predictive data to a user, whether or not to alert a user of existence of predictive data, manner of alerting a user of existence of predictive data (e.g., vibrating a portable device, ... ), etc. Analysis of time information is important due to uncertain delays that can occur between sensors and a predictive model component and between a predictive model component and a user interface component. These delays can be caused by bandwidth issues, computer processing limitations, transmission problems caused by physical impediments between devices (e.g., a user traveling in a tunnel), and the like. As a predictive event relates to an event that may occur in the future, these delays can cause data provided to a user to be outdated and/or less relevant. Aspects of the claimed subject matter contemplate time information to account for such delays in connection with providing predictive data to a user.

In accordance with one aspect of the claimed subject matter, predictive data can be associated with time information generated by a time-stamp generator. Thus, for instance, a time-stamp generator can associate time information with data upon such data being sensed by one or more sensors. Furthermore, time-stamp generator(s) can be utilized to associated time information with sensed data as it is delivered to a predictive model component (e.g., that is resident upon a server) and/or when it is received by a predictive model component. The time information can be analyzed to approximate amount of delay during transmission between sensors and predictive model components, and such delay can be accounted for when providing time-sensitive predictions to a user. Furthermore, at least one time-stamp generator can be utilized to associate time information with a prediction generated by a predictive model component. Over time, computational delays associated with the predictive model component can be approximated and accounted for when determining whether to deliver time-sensitive predictions to a user. Furthermore, a time stamp generator can be utilized to associate predictive data with time information at a time of receipt by a user interface component. Accordingly, over time an amount of delay in transmission can be approximated between the predictive model component and a user interface component, and such delay can be accounted for with respect to presenting predictive data to a user. A time-analysis component can be utilized to analyze the time information associated with the data and generate one or more output determinations that relate to presenting predictive data to a user and/or alerting a user of existence of predictive data. For example, a current time can be compared with the time information to determine if predictive data is outdated and/or determine an order in which to present predictive data.

In another example, a portable device can include the aforementioned time analysis component. For example, a wristwatch associated with a suitable antenna can be employed to provide a user with predictive data, and the wristwatch can include the time-analysis component. As described above, various delays can exist between sensors obtaining data, a predictive model component that generates predictions as a function of data from the sensors, and a user interface component (e.g., a wristwatch). Associating the time-analysis component with the user interface component enables the time-analysis component to account for more delays when compared to association of the time-analysis component with the predictive model component. It is understood, however, that the time-analysis component can be positioned in connection with the predictive model component (e.g., upon a server), with a user interface component (e.g., upon a client), or be associated in multiple locations (e.g., at both a client and a server).

In yet another example, components can be provided that can calculate a probability of correctness associated with the predictive data and a measure of utility associated with the predictive data. For example, a component can compute a probability that predictive data is correct given past performance of a predictive model component, historical data, frequency of occurrence of a predicted event, and the like. Furthermore, a component can compute a measure of utility that can be utilized to determine if content of predictive data will be relevant to a particular user. For example, if a user is in a first geographic region and traveling in a first direction and a prediction relates to a traffic incident at a second geographic region in a direction opposite to the first direction, then such prediction may not be relevant to the user.

In still another example, a forecasting system is described herein, where expected values associated with future times are cached by the forecasting system. A receives within the system and/or associated with the system can receive a prediction and associated future time value and compare such time with a time of reception and/or a time of review by a user. The forecasting system can thereafter automatically select a cached expected value associated with a particular time and reliability and provide such expected value to a user. Thus, a user will receive optimal predictions given uncertainty relating to time delays in transmissions.

To the accomplishment of the foregoing and related ends, certain illustrative aspects are described herein in connection with the following description and the annexed drawings. These aspects are indicative, however, of but a few of the various ways in which the principles of the invention may be employed and the claimed subject matter is intended to include all such aspects and their equivalents. Other advantages and novel features may become apparent from the following detailed description when considered in conjunction with the drawings.

DETAILED DESCRIPTION OF THE INVENTION

Figure 1:
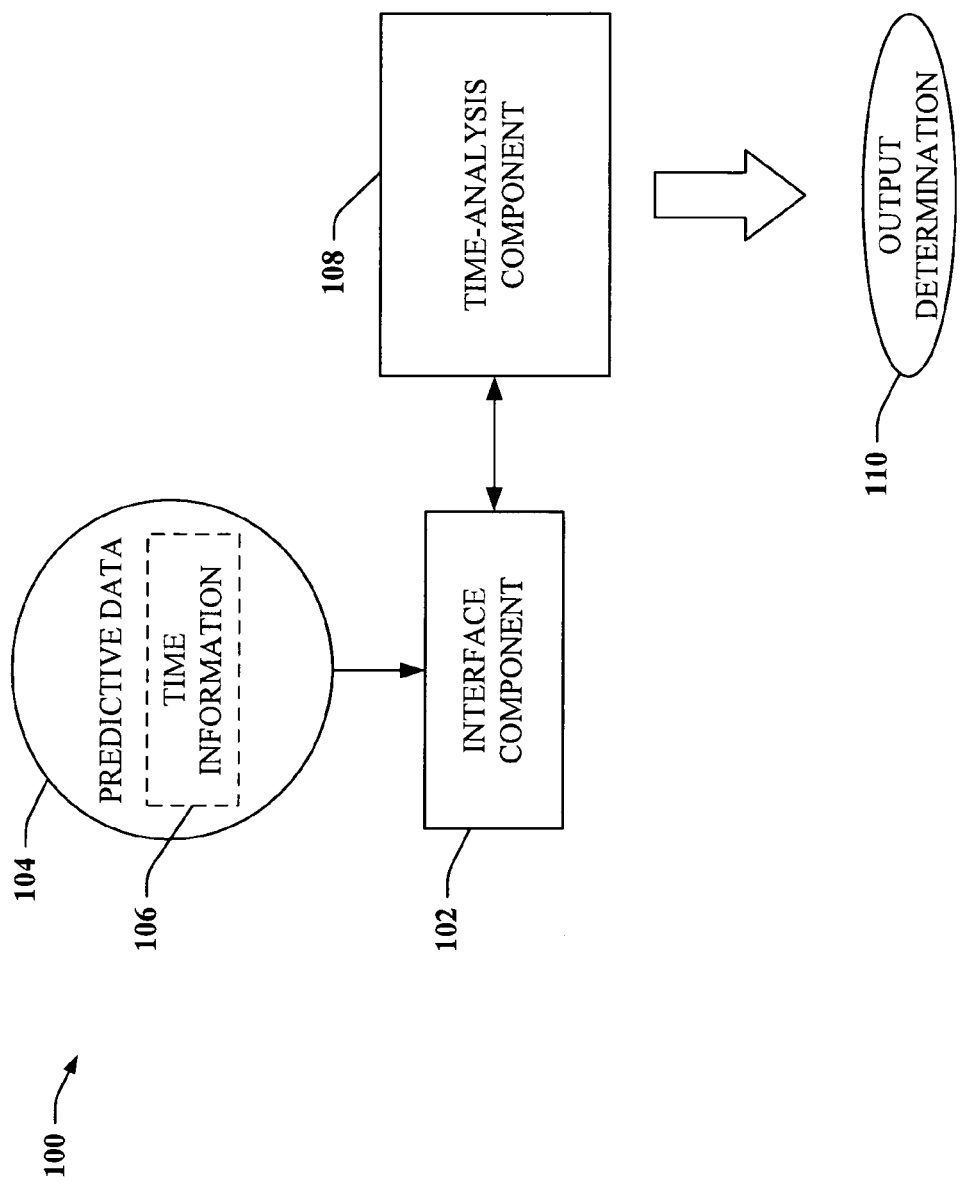
FIG. 1 is a high-level block diagram of a system that facilitates analyzing time information associated with predictive data in connection with generating an output determination.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Systems employing automated reasoning and/or machine learning (e.g., using explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action.

Furthermore, the claimed subject matter may be implemented as a method, apparatus, or article of manufacture using standard programming and/or engineering techniques to produce software, firmware, hardware, or any combination thereof to control a computer to implement the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

The subject invention will now be described with respect to the drawings, where like numerals represent like elements throughout. Referring now to FIG. 1, a system 100 that facilitates analyzing time-dependent information, determining which data to present to a user, and a manner of presentation of such data. The system 100 can be utilized to mitigate occurrences of a user being provided with outdated or irrelevant information. The system 100 includes an interface component 102 that receives predictive data 104 (e.g., data output and/or utilized by a predictive model). For example, the predictive data 104 can be data relating to prediction of an event that may occur at a future point in time and/or can be data representative of current observations. The predictive data 104 can be associated with time information 106, wherein such time information 106 can indicate time of creation of a prediction (e.g., output by a predictive model that utilizes Bayesian networks, . . . ), time of creation of data (e.g., time of sensing of a condition), time of receipt of data by a predictive model, and any other suitable time information that may be relevant to output of a prediction or current observations.

The interface component 102 can be resident upon a client and/or resident upon a server. For instance, the interface component 102 can be existent within a wristwatch, wherein the interface component 102 receives a prediction and/or prediction-related data that may be desirably provided to a user (via a graphical user interface, speakers, . . . ). In another example, the interface component 102 can exist within a server that includes a predictive model, wherein the interface component 102 receives data from sensors that may be desirably delivered to the predictive model. As described above, delays can exist in creation of the predictive data 104 and receipt of such data 104 by the interface component 102. Accordingly, data that may have been relevant to a user at time of creation may no longer be relevant at a time of receipt thereof by the interface component 102.

A time-analysis component 108 analyzes at least the time information 106 associated with the predictive data 104 and generates an output determination 110 as a function of the analysis. For example, the output determination 110 can relate to which data to output, a time to output data, a sequence of outputting data, a manner in which to inform a user of data (e.g., presentation in a display, vibrating a cellular phone, causing speakers to output an audio alert, . . . ). The time-analysis component 108 can generate the output determination 110 as a function of a comparison between the time information 106 associated with the predictive data 104 and a current time. Thus, if the predictive data 104 is outdated (e.g., the predictive data relates to an event that is predicted to occur at a point in time that is in the past), then the time-analysis component 108 can generate the output determination 110 that indicates that the prediction should not be provided to the user. Furthermore, the time-analysis component 108 can generate the output determination 110 given a plurality of data packets. In other words, the time-analysis component 108 can make a determination that provides a predictive model and/or a user most relevant information in light of uncertain time delays of data transmittal.

In accordance with one aspect of the claimed subject matter, the time-analysis component 108 can utilize a lookup table (not shown) in connection with generating the output determination 110 (which, as described above, can relate to time of outputting data, whether to output data, mode of output of data, . . . ). Thus, if the predictive data 104 and the time information 106 are associated with particular parameters, such as type of prediction, time, etc., then the time-analysis component 108 can create the output determination 110 through utilizing the parameters and locating the corresponding output determination within the lookup table. In one example, the time-analysis component 108 can utilize various rules in connection with generating the output determination 110. For instance, a rule can be utilized that prevents outdated predictions from being provided to a user. More complex rules with various interdependencies between parameters within the predictive data 104 and the time information 106 are contemplated by the inventor and intended to fall under the scope of the hereto-appended claims.

In another example, the time-analysis component 108 can employ machine-learning techniques to make inferences regarding the output determination 110. For example, the time-analysis component 108 can determine a measure of utility in connection with informing a user of a prediction given a current time and the time information 106. For instance, if the predictive data 104 has not been subject to substantial delay and the subject matter is pertinent to a user, the time-analysis component 108 can assign a high measure of utility to the predictive data 104. The output determination 110 can reflect this high measure of utility (e.g., by way of manner of notification of the data to a user, manner of presentment, . . . ). Further, the time-analysis component 108 can undertake a probabilistic analysis of the predictive data 104 in connection with generating the output determination 110. For instance, the time-analysis component 108 can calculate a probability that the predictive data 104 is relevant to a user given the time information 106 and a current time. This probability can be compared with calculated probabilities associated with disparate predictive data 104, and most relevant data can be provided to the user as a function of the calculated probabilities. These probabilities can alter with time—accordingly, data found to be most probable to be of utility to a user at a given time can be provided to the user, and data found to be least probable can be discarded or stored for later analysis.

To provide additional context, one exemplary utilization of the system 100 is described herein. The system 100 can be employed by a user who reviews information output by such system 100. There can be uncertainty about when the user will review such information, however, due to user delay (e.g., not frequently reviewing a device) or uncertainty in receipt based upon stochastics of a transmission system. As there may always be a delay or intermittent connectivity of a transmission system, a packet of information (e.g., the predictive data 110) that includes values about a prediction of interest or of value to a user can be delivered to such user. In one example, the packet of information can include a prediction that is associated with time information (e.g., generated by a timestamp generator) and a reliability metric (e.g., a variance of time within which a predicted event will occur). Thereafter, the packet of information can be received and/or reviewed, and a time of reception and/or review can be monitored. Values for the prediction can then be selected (together with a reliability associated with the time) and provided to one or more users. In other words, the packet of information can relate to a prediction, which can have various disparate values and reliabilities depending upon time of review (e.g., stored in table form). Upon receipt, the table can be analyzed and a most-relevant prediction and reliability can be provided to one or more users.

In a more specific example, if the system 100 is utilized in connection with predicting traffic parameters, the predictive data 104 can include predictions relating to traffic conditions (e.g., location of congestions, congestion levels, . . . ) at disparate times in the future, together with reliability associated therewith. For instance, reliability may decrease as predictions are made further out in time. Thus, in a detailed example, if a traffic forecast is undertaken at 9:30 (based on current observations, previous observations, and other suitable traffic indicia), the predictive data 104 can include a list of predictions, one for disparate points in time. For instance, the points in time can be discretized into five minute blocks. Accordingly, the predictive data 104 can include a probability that one or more regions of a roadway are congested at each five minute increment, and can further include reliability data associated with predictions beyond that of the probability (e.g., a 40% probability of congestion is calculated for a particular time, with an error tolerance of +/− ten minutes for such time). In another example, rather than utilizing discrete times associated with predictions, a function that maps future values of something of interest to a user to a continuous function of time can be employed.

The interface component 102 can receive the predictive data 104 and relay such data 104 to the time analysis component 108. For example, there can be a delay in transmission of the predictive data 104 from a source (not shown) to the interface component 102 and the analysis component 104. The time analysis component 108 can determine a current time (e.g., 9:45, indicating a fifteen minute delay), and generate the output determination 110 accordingly. The output determination 110 in this example would be to provide one or more users with a prediction within the predictive data 104 that is associated with the time of 9:45. Further, the analysis component 104 can select a reliability associated with the output prediction, and utilize such prediction to output a graphical indication to a user that a traffic region relevant to such user will be congested, for example, for another fifteen minutes with a reliability of +/− ten minutes. If the reliability is above a threshold (e.g., too great a time variance), the data may be withheld from the user. While this example has referred to traffic, it is understood that any suitable predictive data can be utilized in connection with the claimed subject matter, such as weather, stock market, amusement park lines, and the like.

Figure 2:
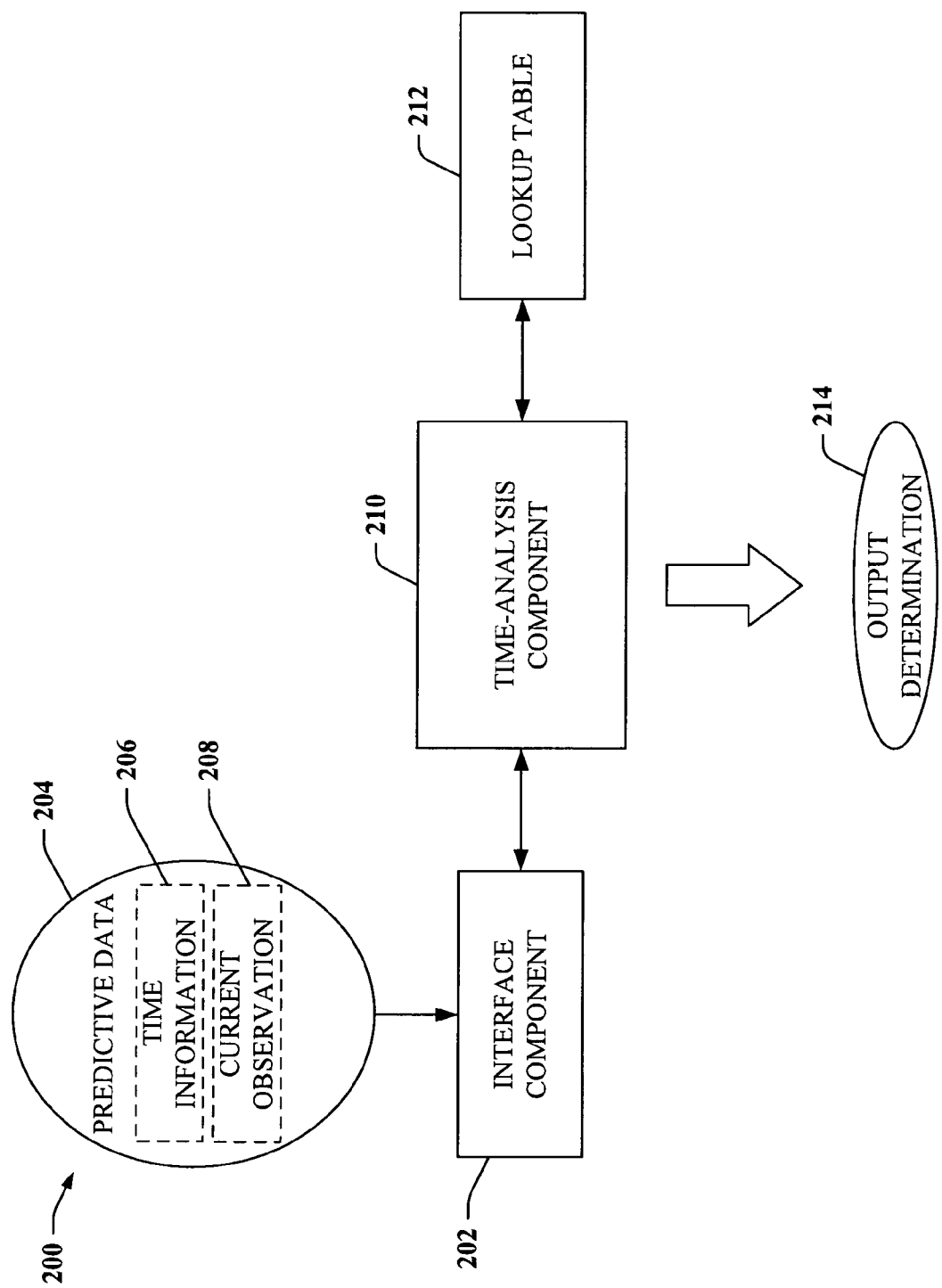
FIG. 2 is a block diagram of a system that facilitates analyzing time information associated with predictive data by way of a lookup table to make decisions relating to presentment of the predictive data to a user.

Turning now to FIG. 2, a system 200 that facilitates determining when and how time-related predictive data is provided to a user is illustrated. The system 200 includes an interface component 202 that receives predictive data 204. The predictive data 204 can be, for example, a prediction generated by a predictive model (not shown), sensed data utilized in connection with generating a prediction, data representative of states of one or more variables, etc. The predictive data 204 can be associated with time information 206 as well as a current observation 208. For example, the time information 206 can indicate a time of creation of the predictive data 204, a time of receipt of the predictive data 204, and/or a time of transmittal of the predictive data 204. Thus, any suitable information relating to time can be encapsulated within the time information 206. The current observation 208 can include data representing a captured event, states of information indicating occurrence of an event, etc.

The predictive data 204, once received by the interface component 202, can be relayed to a time-analysis component 210. The interface component 202 and the time-analysis component 210 can communicate with one another to confirm transmittal and receipt of the predictive data 204. The time-analysis component 210 analyzes content of the predictive data 204 and the time information 206 associated therewith to ensure that a user is provided with relevant data. For instance, the time-analysis component 210 can receive a substantial amount of data, and it is desirable that a user be provided with most relevant data. Often, however, the predictive data 204 can be subject to uncertain delays. Specifically, data generated from a sensor can be subject to delay as it is delivered to a server, and the data therein can be subject to further delay due to computing being undertaken at such server. Thereafter, data output from a server can be delayed in transmission. For instance, physical impediments, weather conditions, location of a user, and the like can cause delays in transmission of data. The time-analysis component 210 analyzes at least the time information 206 associated with the predictive data 204 to account for such delays and assist in providing a positive user experience.

The time-analysis component 210 can utilize a lookup table 212 in connection with generating an output determination 214, wherein the output determination 214 relates to data output to a user, manner of outputting data to a user (e.g., vibrating device, audible notice, displayed on a screen, . . . ), time data is output to a user, duration that data is displayed on a screen, color and organization of a display, etc. It is thus apparent that the time-analysis component 210 can assist in determining any suitable output/presentation parameter associated with the predictive data 204. The time-analysis component 210 can employ the lookup table 212 with respect to generating the output determination 214. For instance, the predictive data 204 can be associated with particular parameters, such as the time information 206 and the current observation 208, and such parameters can be contemplated within the lookup table 212. More specifically, the predictive data 204 can relate to an event, the time information 206 can include predicted time of occurrence of the event, and the current observation 208 can include current states of sensors and/or aggregation of states. The time-analysis component 210 can recognize the information associated with the predictive data 204 and generate the output determination 214 by way of correlating such information with at least a portion of the lookup table 212.

As described above, the time-analysis component 210 can be located within a portable device such as a wristwatch, PDA, and the like, and/or can be located within a server that provides data to such devices. Furthermore, the time-analysis component 210 can be resident within stationary consumer-level devices, such as a desktop computer, a computing component within an automobile, etc. Furthermore, the time-analysis component 210 can exist within both a server and a client, thereby accounting for multiple levels of uncertain delay. Disparate lookup tables can be utilized depending on use of the time-analysis component 210—for instance, over time it can be determined that a server is subject to delays of one order and a client is subject to delays of another order. Accordingly, the time-analysis component 210 can be customized according to desired employment thereof.

Figure 3:
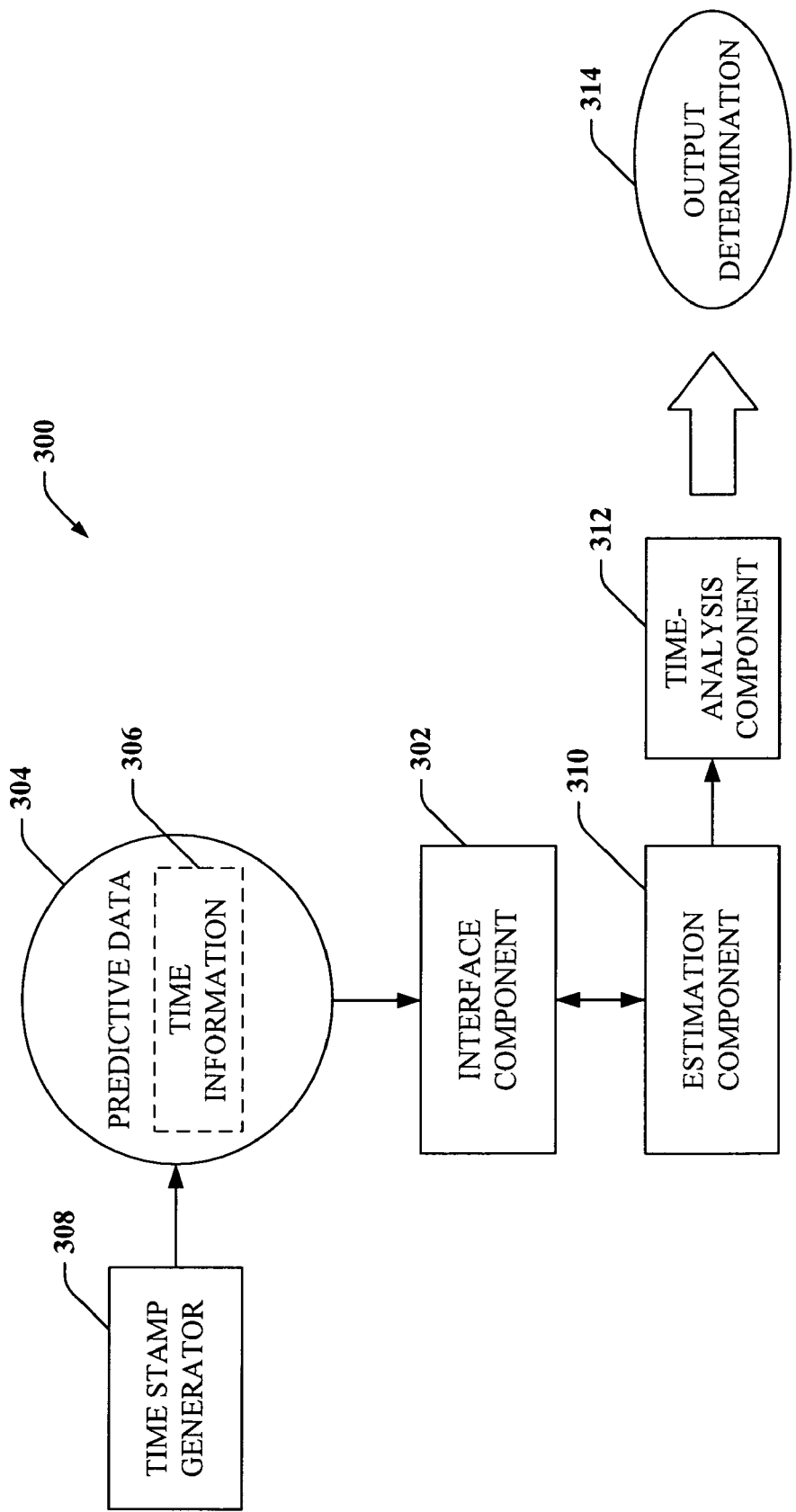
FIG. 3 is a block diagram of a system that facilitates analyzing a probability of correctness associated with predictive data in connection with generating an output determination.

Now referring to FIG. 3, a system 300 that facilitates determining output parameters of data as a function of a time-based analysis is illustrated. The system 300 includes an interface component 302 that receives predictive data 304 with time information 306 embedded therein. The time information 306 can be created by a time stamp generator 308, which can be associated with one or more sensors, a server, a transmitter, a receiver, or any other suitable component. For example, data can be time-stamped at time of creation by a sensor, at time of receipt by a server, upon creation of a data packet at a server through various computations, at time of transmittal to a client, at time of receipt by a client, or any other suitable time. Furthermore, the time stamp generator 308 can embed additional information within the predictive data 304, such as geographical information.

An estimation component 310 can receive the predictive data 304 by way of the interface component 302, wherein the estimation component 310 and the interface component 302 can communicate with one another to ensure receipt of an entirety of the predictive data 304. The estimation component 310 is utilized to determine a probability of correctness associated with the predictive data 304. For instance, the predictive data 304 can relate to an event that is predicted to occur at a future point in time. The estimation component 310 can calculate a probability that the prediction described by the predictive data 304 will actually occur. If the calculated probability of correctness associated with the predictive data 304 is very low, a user may not find such predictive data 304 highly relevant, and may wish not to be informed of the predictive data 304. If, however, the calculated probability is above a threshold, the user may find the predictive data 304 highly relevant. Thus, a determination regarding whether to provide a user with the predictive data 304 can be made based at least in part upon probabilities generated by the estimation component 310.

A time-analysis component 312 can also analyze the predictive data 304 to generate an output determination 314 in connection with the predictive data 304. More specifically, the time-analysis component 312 can analyze the time information 306 within the predictive data 304 (placed in the predictive data 304 by the time stamp generator 308). For instance, if the estimation component 310 finds that an event represented by the predictive data 304 has a sufficiently high probability of occurrence, and if the time information 306 indicates that the predictive data 304 remains relevant, then the output determination 314 can relate to timely providing a user with the data. If the predictive data 304 is found not to be relevant to a user, the output determination 314 can relate to preventing the predictive data 304 from being provided to a user.

Figure 4:
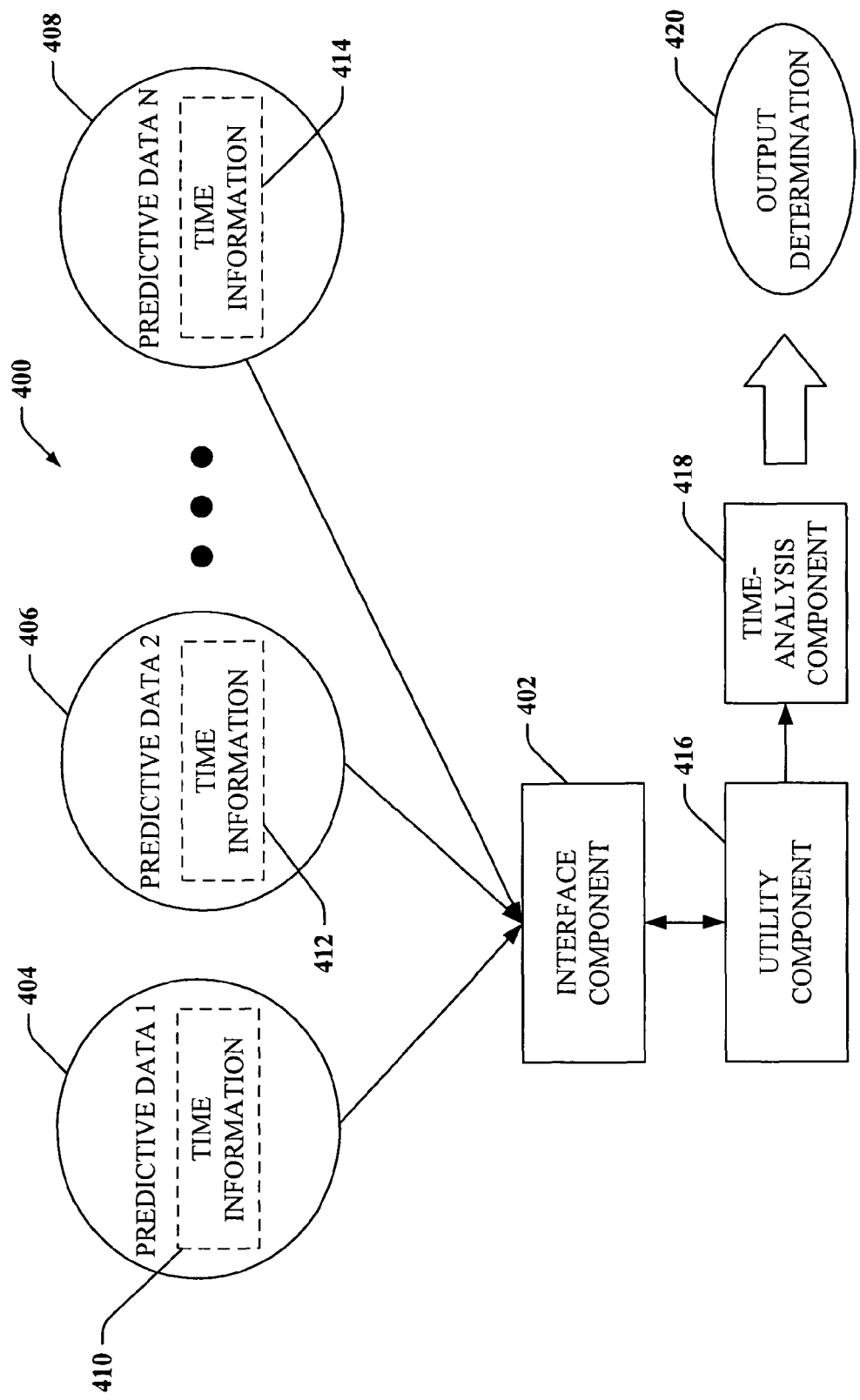
FIG. 4 is a block diagram of a system that facilitates calculating a measure of utility associated with predictive data and utilizing the calculated measure to generate an output determination.

Now referring to FIG. 4, a system 400 that facilitates determining whether to provide a user with predictive information and a manner in which to provide the user with predictive information is illustrated. The system 400 includes an interface component 402 that receives a plurality of data. More specifically, the interface component 402 can receive N number of predictive data packets 404-408, where N is an integer. The predictive data packets 404-408 can be associated with disparate uncertain delays between creation of such packets 404-408 and reception by an end device (not shown). The predictive data packets 404-408 can be associated with time information 410-414, wherein the time information 410-414 can include data relating to creation of a respective data packet, reception of a respective data packet, and the like.

The interface component 402 can relay the data packets 404-408 to a utility component 416 that calculates a measure of utility associated with each of the predictive data packets 404-408. For example, sensors can indicate that a user is currently traveling on a particular portion of road in a northerly direction, and the predictive data packet 404 can relate to a predicted accident that occurs on a disparate portion of road in a southerly direction from the user. This information is not particularly relevant to the user, as it does not affect the user's travel plans. In another example, the predictive data can relate to a stock or mutual fund that a user does not own and does not currently have capital to purchase—therefore, information relating to such stock is not relevant to the user. The utility component 416 can consider user feedback and past utilization of the system 400 in connection with determining a measure of utility associated with each of the predictive data packets 404-408. For instance, for an integer number of uses, a user can be requested to provide feedback relating to utility of particular events, and the utility component 416 can be trained as a function of such feedback. More specifically, classifiers or other machine-learning mechanisms can be utilized to train the utility component 416.

A time-analysis component 418 can further analyze the predictive data packets 404-408 and the time information 410-414 associated therewith, and in connection with the measure of utility generated by the utility component 416 such analysis can be utilized to generate an output determination 420. As described above, the output determination 420 can relate to which data to present to a user, a manner in which to present the data, whether or not to alert a user of a predicted or occurring event, a manner to alert the user, etc. For instance, the output determination 420 can relate to causing a portable device to vibrate, thereby alerting a user of available information, and thereafter presenting the user with the information by way of a graphical user interface and/or audibly presenting the user with at least a portion of one or more selected predictive data packets (of the predictive data packets 404-408).

In one example, the time-analysis component 418 can consider a current time and user context when generating the output determination 420. An example is provided herein to better portray such exemplary functionality of the time-analysis component 418 and the utility component 416. The predictive data packet 404 can be received by the interface component 402 and passed upon to the utility component 416, which determines that content of the predictive data packet 404 is associated with sufficient utility to a user to inform the user of such content. The time-analysis component 418 can thereafter analyze the time information 410 within the predictive data packet 404 to ensure that data therein is not outdated or been subject to substantial delay. The time-analysis component 418 can then compare the time information 410 with a current time for further assurance that data within the predictive data packet 404 is relevant. Moreover, the time-analysis component 418 can generate the output determination 420 by analyzing a user context with respect to time. For instance, if a user's electronic calendar indicates that such user is in a meeting, the time-analysis component 418 can generate the output determination 420 so that the user is not disturbed during such meeting (e.g., notification is delayed until after the meeting). In another example, GPS data upon a user's cellular phone can indicate that the user is away from his computer—thus, notification can be provided to the user by way of the cellular phone, and content can be formatted for display thereon.

Referring now to FIGS. 5-8, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
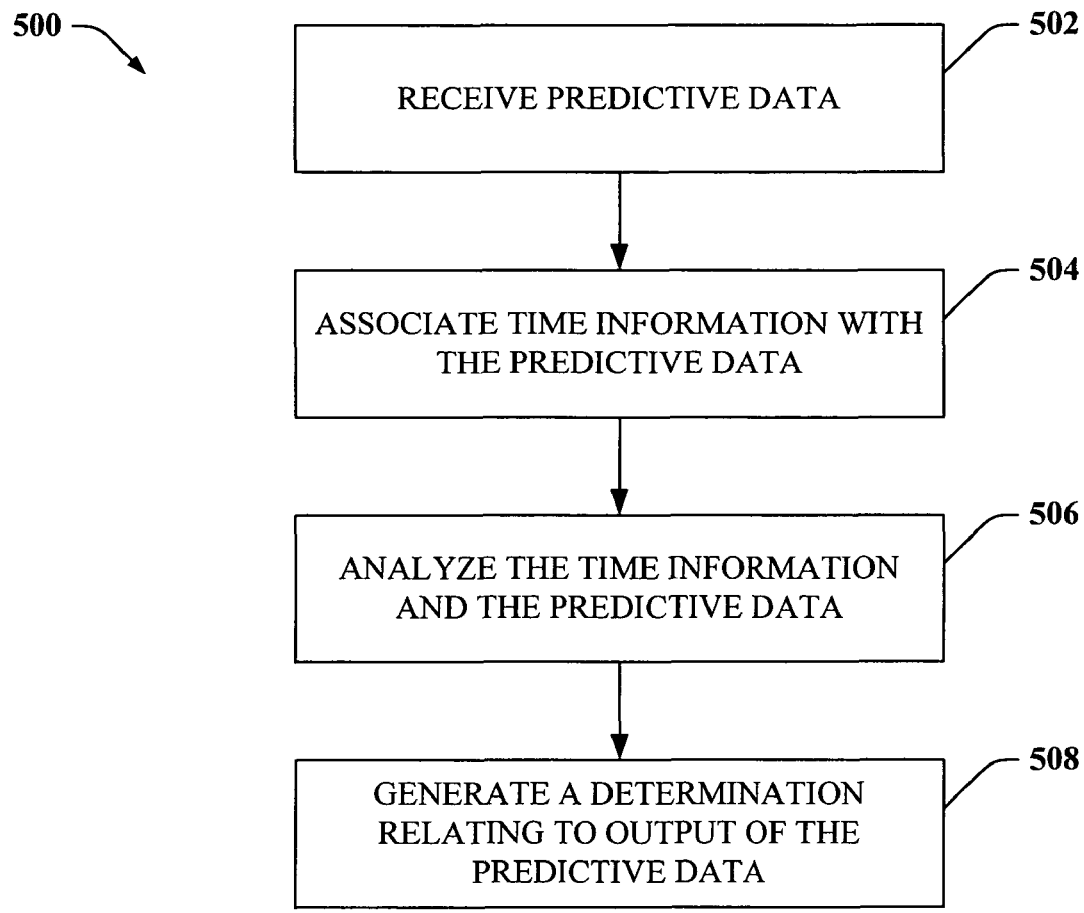
FIG. 5 is a representative flow diagram illustrating a methodology for analyzing time information associated with predictive data.

Turning solely to FIG. 5, a methodology 500 that facilitates determining at least one output parameter associated with predictive data is illustrated. At 502, predictive data is received. For example, the predictive data can be received from a predictive model that is employed to predict events that a user would find to be surprising. Thus, as the model is utilized to predict events that may occur in the future, an amount of delay between obtaining data, computing data into a prediction, and delivering the prediction is an important factor when considering a time and manner to deliver and display data, respectively, to a user. At 504, time information is associated with the predictive data. For example, one or more time-stamp generators can be employed to associate predictive data with time. Data generated by sensors, data manipulated by a predictive model, and other suitable data can be associated with a time-stamp or other suitable time information. Furthermore, the data can be associated with the time information at any suitable time. For instance, time information can be associated with data during sensing of data, upon receipt of the data at a server, upon deliverance of data from a server to a client, upon receipt of data at a client, and the like.

At 506, the time information associated with the data is analyzed as well as the predictive data associated therewith. For example, the time information can be compared with a current time to determine if the predictive data is outdated, the time information can be analyzed to determine if it is imperative that the predictive data be provided to a user within a particular amount of time, etc. At 508, a determination relating to output of the predictive data can be generated as a function of the analysis of the time information and the predictive data. For instance, relative time to deliver disparate portions of data can be determined (e.g., which portion to deliver first), a manner of displaying a portion of data can be determined, and the like.

Figure 6:
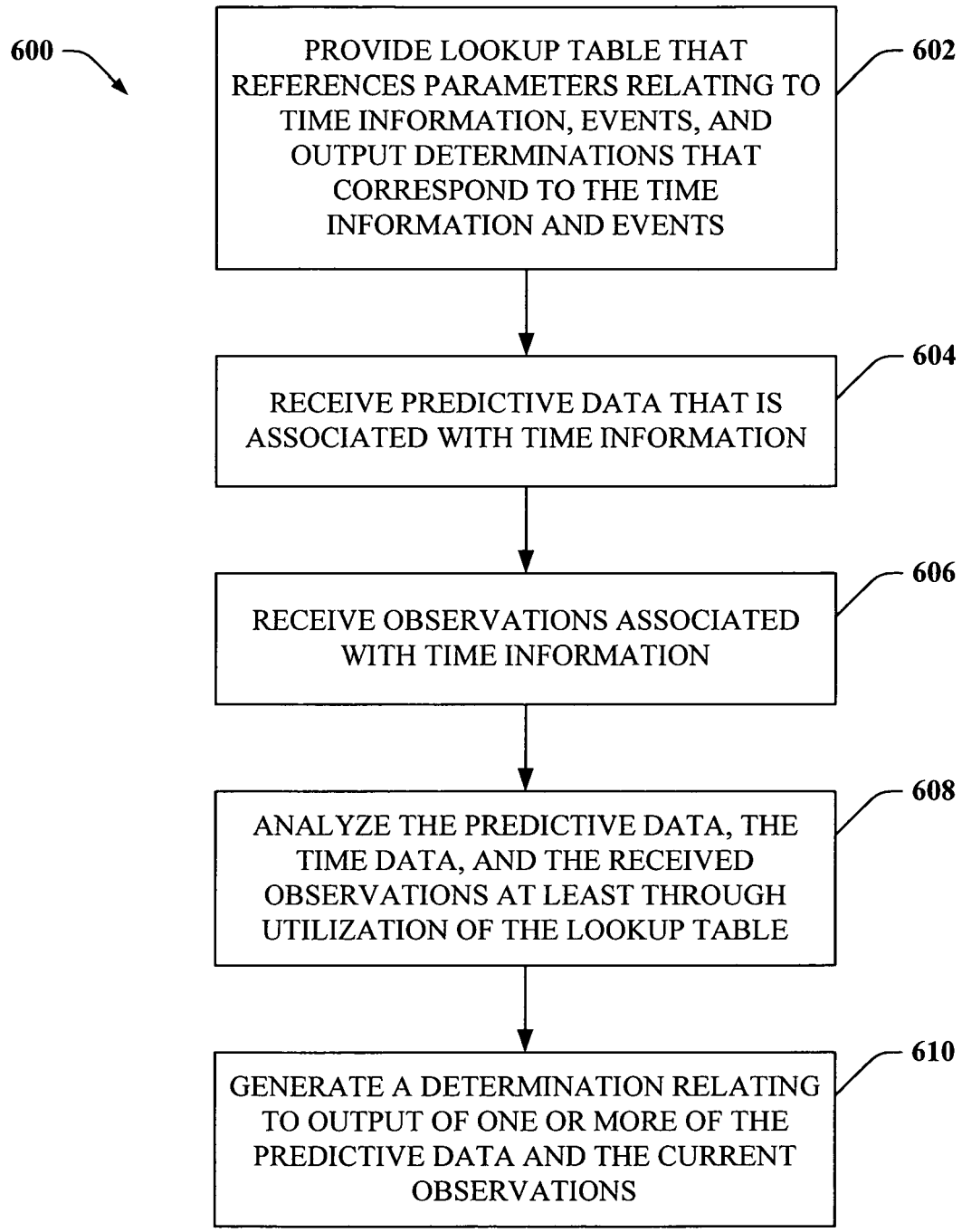
FIG. 6 is a representative flow diagram illustrating a methodology for utilizing a lookup table to generate output determinations relating to predictive data.

Referring now to FIG. 6, a methodology 600 that facilitates determining a time and manner of outputting predictive data is illustrated. At 602, a lookup table is provided that references parameters relating to time information, events, and output determinations that correspond to the time information and events. For example, given particular time information and a specified predicted event, an action relating to outputting predictive data to a user can be illustrated. At 604, predictive data that is associated with time information is received. As described above, the predictive data can be generated from a model that predicts events that are surprising to typical users. Any predictive model, however, can be employed in connection with the methodology 600.

At 606, observations associated with the time information are received. In particular, the observations indicate a state or set of states of sensors. In other words, the current observations are not predictions—they represent actual data that has been obtained. At 608, the predictive data, time data, and received observations are analyzed at least through utilization of the aforementioned lookup table. Other suitable analysis can also be undertaken upon one or more of the predictive data, time data, and received observations. The lookup table can be utilized to make a determination relating to output of the predictive data (e.g., time of output, device in which to output data, . . . ). At 610, a determination relating to output of one or more of the predictive data and the current observations is generated. This output determination can be a function of analysis of the lookup table. For example, given particular time information and a predicted event, a manner of outputting current observations can be determined.

Figure 7:
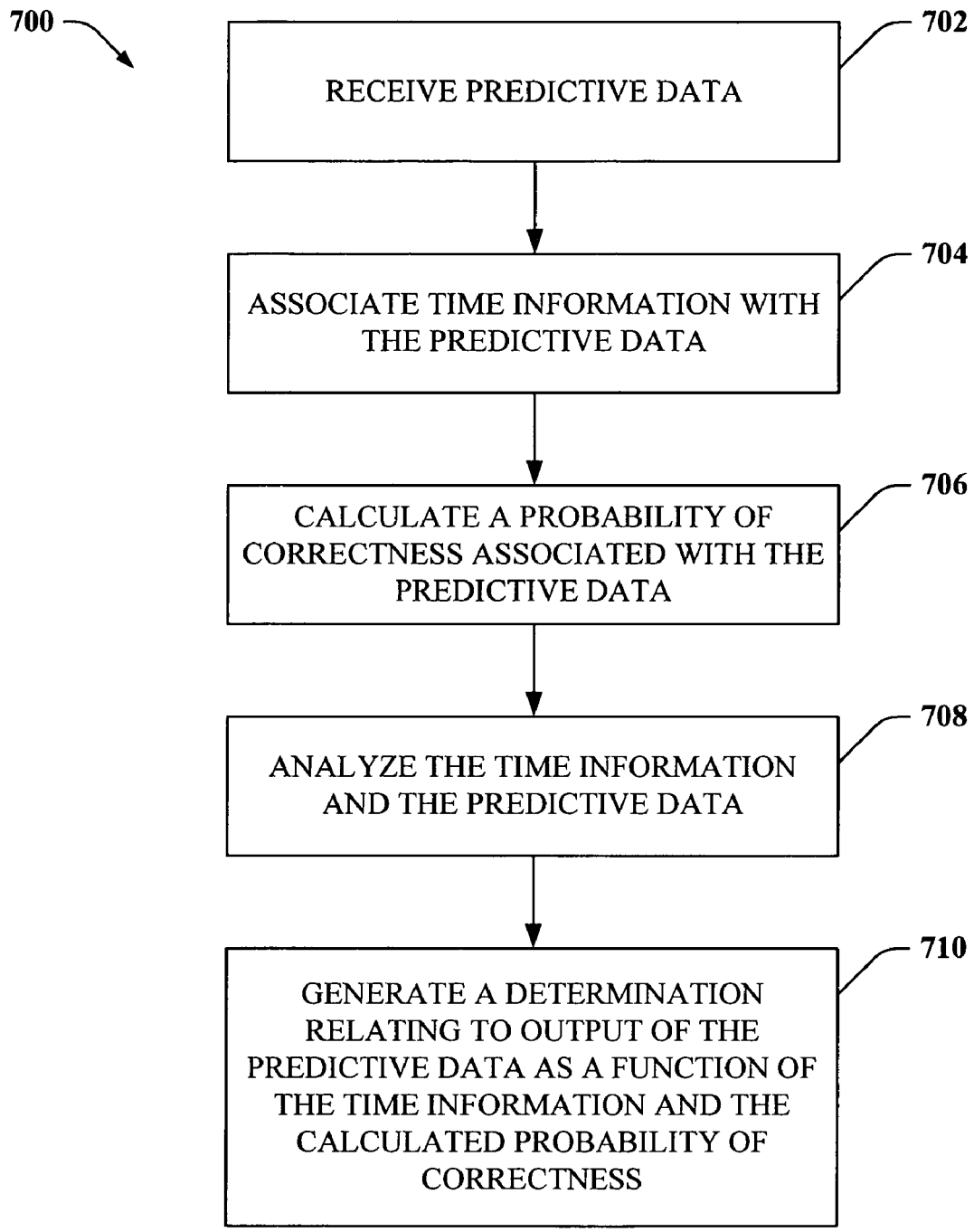
FIG. 7 is a representative flow diagram illustrating a methodology for calculating a probability of correctness associated with predictive data and outputting the predictive data as a function thereof.

Turning now to FIG. 7, a methodology for determining a time in manner to output predictive data is illustrated. At 702, predictive data is received, and at 704 time information is associated with the predictive data. At 706, a probability of correctness associated with the predictive data is calculated. For instance, historical data can be analyzed to determine a frequency of an event occurring, and a probability of correctness can be a function thereof. Further, observations obtained from sensors can be utilized by a predictive model to generate predictions and probabilities of correctness associated therewith.

At 708, the time information and the predictive data are analyzed. For instance, such analysis can be utilized to aid in prevention of deliverance of outdated predictive data, as well as assist in organizing data in time to improve performance from a user perspective. Thus, based upon the analysis, predictive data packets can be organized in time and delivered to a user in a specified order. Furthermore, timing and types of alerts can be determined as a function of the analysis, as well as devices in which to provide an alert and/or to which to provide data. At 710, a determination relating to output of the predictive data is generated, wherein such determination is a function of the time information and the calculated probability of correctness. For example, if the time information indicates that the predictive data is outdated and the probability of correctness is extremely low, then the predictive data may not be provided to a user. If the calculated probability of correctness is very high, and the predictive data is not outdated, then such data may be provided to a user, and a manner of deliverance can be determined.

Figure 8:
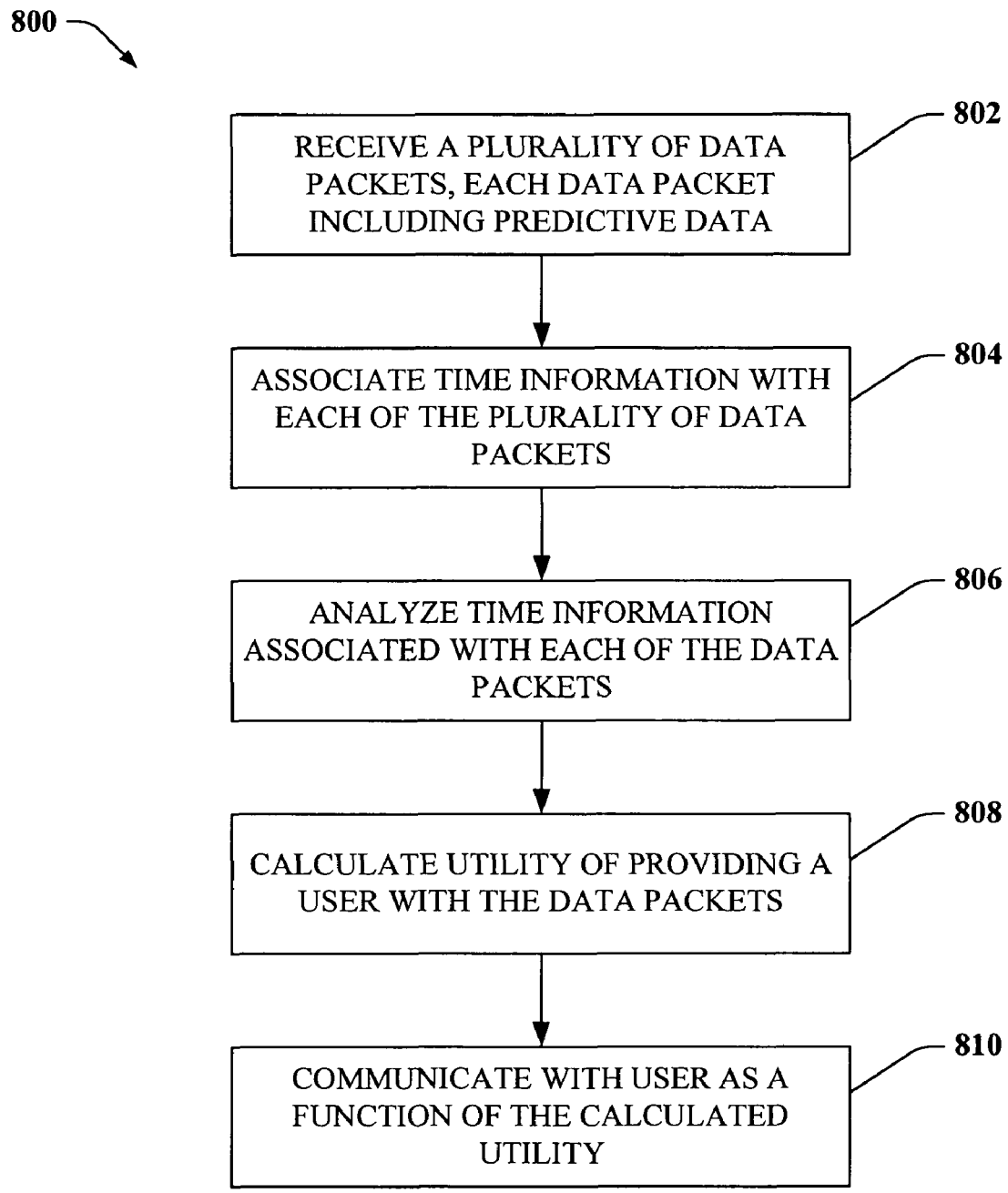
FIG. 8 is a representative flow diagram illustrating a methodology for computing a measure of utility associated with predictive data and outputting the predictive data as a function thereof.

Now referring to FIG. 8, a methodology 800 that facilitates outputting data to a user as a function of time and a computed utility associated with an event is illustrated. At 802, a plurality of data packets are received, wherein each of the data packets relates to a predicted event. The plurality of data packets, while created or relayed in a first order, can arrive at a client device in a second order due to service delays and the like. At 804, time information is associated with each of the plurality of data packets. For instance, time of creation, time of transmission, time of reception by a server, or any other suitable time associated with the data packets can be associated therewith.

At 806, the time information associated with each of the data packets is analyzed. For instance, the analysis can be a comparison of time information between data packets, a comparison of time information within one or more data packets to a current time, etc. At 808, a measure of utility associated with providing a user with the data packets is calculated. The measure of utility can be calculated as a function of the analyzed time information, as a function of user feedback and/or user experiences, and the like. For example, a user can be provided with a prediction that is not interesting to such user (e.g., the user wishes not to receive the prediction). A feedback mechanism can be provided that enables the user to deliver feedback with respect to predictions communicated to such user. Thus, for instance, the user can indicate whether the prediction was highly relevant, associated with some relevance, is not relevant, etc. Radio buttons, slide rules, or any other suitable interface can be employed to enable the user to provide feedback with respect to utility of a prediction. At 810, the user is communicated with as a function of the calculated utility. In particular, which data, a time of deliverance of data, manner of deliverance of data, device to deliver data, manner of alerting a user of existence of data, and other suitable communications can be determined as a function of the calculated utility and communication to the user can be undertaken accordingly.

Figure 9:
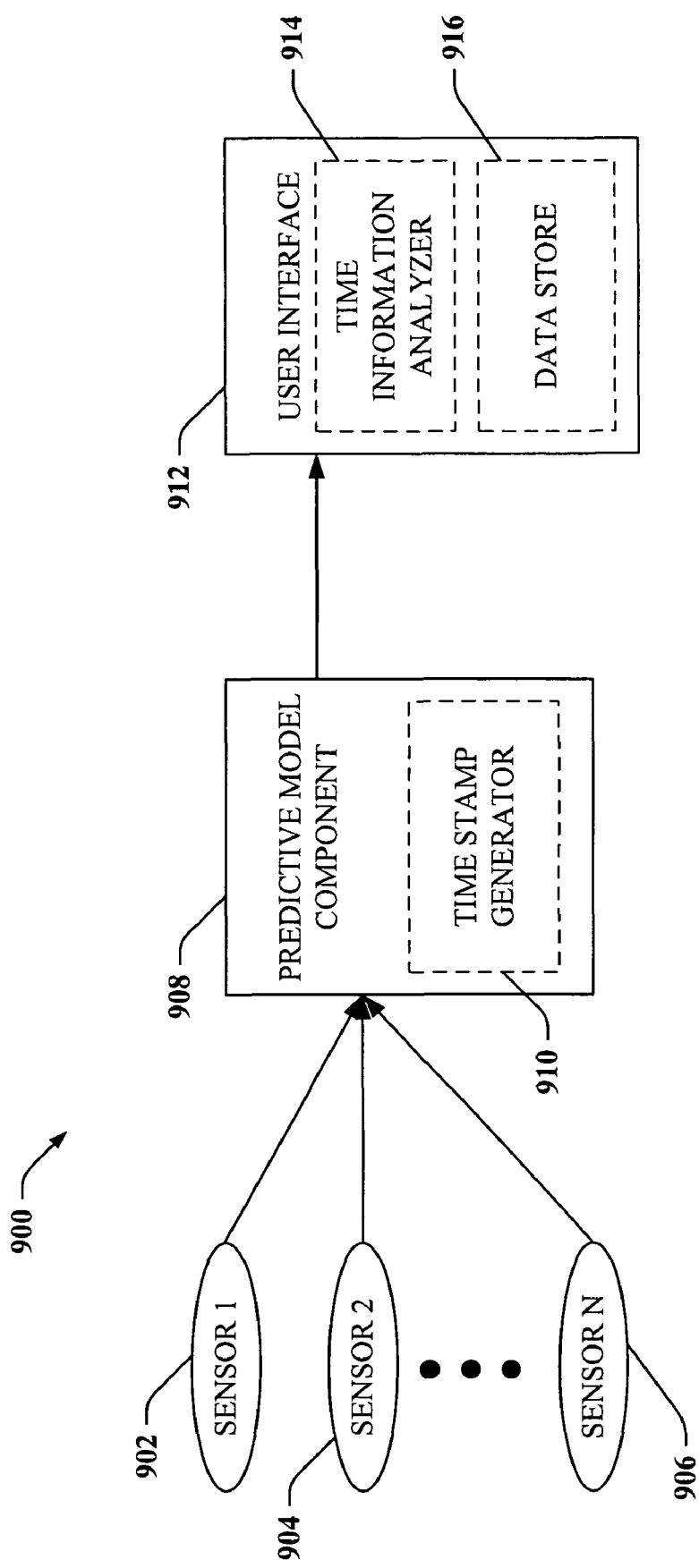
FIG. 9 is an exemplary system that can employ one or more novel aspects of the claimed subject matter.

Now turning to FIG. 9, an exemplary system 900 that can employ one or more novel aspects of the claimed subject matter is illustrated. The system 900 includes a plurality of sensors 902-906 that are utilized to retrieve contextual data. For example, the sensors can be cameras, weight sensors, position sensors such as GPS sensors, Internet crawlers that locate contextual data, voice analysis components that retrieve information from broadcasts, and the like. Data from the sensors can be delivered to a predictive model component 908 that generates predictions of events that may occur in the future as a function of the data received by the sensors 902-906. For example, the predictive model component 908 can be built by way of machine-learning methods, such as exposing one or more classifiers to historical data. The classifier can locate patterns and build a network based upon such patterns. The received data from the sensors 902-906 can be associated with nodes of the network, thereby enabling the predictive model component 908 to output predictions.

The predictive model component 908 is associated with a time stamp generator 910 that can associate time information with data received by the sensors 902-906 and/or can associate time information with a prediction generated by the predictive model component 908. Utilization of time information is important due to transmission and computational delays that can exist within the system 900. For example, uncertain delays in time can exist between a time that data is generated by the sensors 902-906 and a time that a user interface 912 receives a generated prediction. The time stamp generator 910 enables timing information to be associated with predictive data to assist in accounting for the uncertain delays.

The user interface 912 receives the predictive data and utilizes a time information analyzer 914 to analyze timing information embedded within the predictive data by the time stamp generator 910. For instance, the time information analyzer 914 can compare a timing information within predictive data with a current time or pre-set time, and determine whether the predictive data should be output as a function of the analysis. Moreover, the time information analyzer 914 can be employed to determine a manner to alert a user, display parameters, timing information associated with displaying predictive data, etc. The user interface 912 can be further associated with a data store 916 that enables storage of predictive data for display. For instance, if various portions of predictive data are received by the user interface 912 and desirably displayed, some of the portions of predictive data can be stored within the data store 916 for display at a later time while others portions can be immediately provided to a user.

Figure 10:
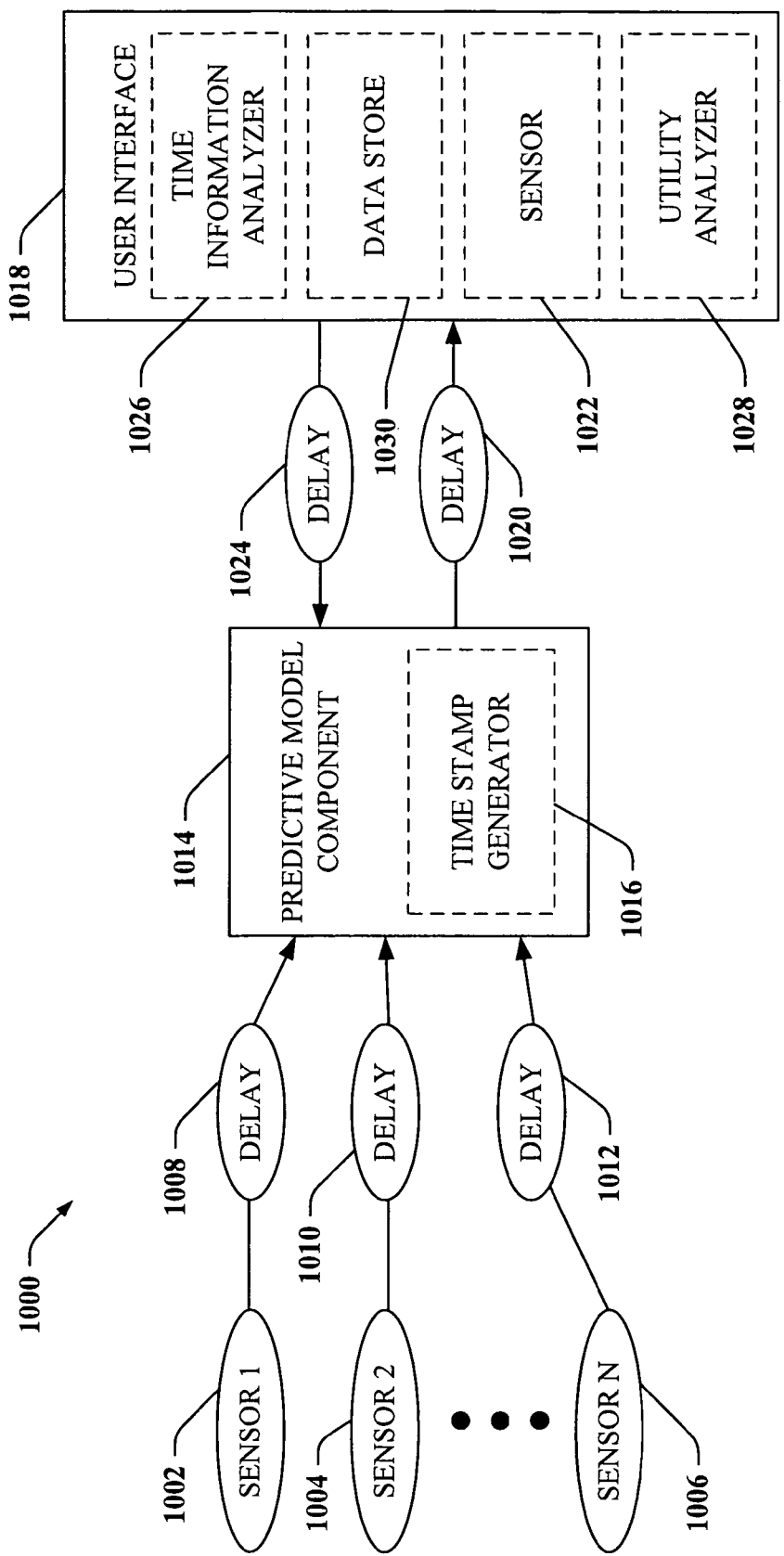
FIG. 10 is an exemplary system that can employ one or more novel aspects of the claimed subject matter.

Now referring to FIG. 10, an exemplary system 1000 that illustrates one or more novel aspects of the claimed subject matter is shown. The system 1000 includes a plurality of sensors 1002-1006 that generate/obtain data relating to a desirably predicted event. Each of the sensors 1002-1006 can be associated with delays 1008-1012, wherein the delays 1008-1012 are uncertain in time. Data from the sensors 1002-1006 is received by a predictive model component 1014 which can generate a prediction of an event that will occur at some point in the future. The predictive model component 1014 can be associated with a time stamp generator 1016 that associates received data and/or output data with time information. A prediction can be delivered to a user interface 1018 that is utilized to alert a user of a prediction and/or provide information relating to the prediction generated by the predictive model component 1014. Any prediction relayed to the user interface 1018 can be subject to an uncertain delay 1020 due to, for example, lack of memory associated with the user interface 1018, transmission difficulties between the predictive model component 1014 and the user interface 1018, etc.

Further timing issues can result as the user interface 1018 can be associated with a sensor 1022 that relays information of the predictive model component 1014. Moreover, if the user interface 1018 is portable and/or currently moving and the sensor 1022 is a position sensor (such as a GPS sensor), time/space issues can result, as an uncertain delay 1024 can exist between the sensor 1022, the user interface 1018, and the predictive model component 1014. For example, a user traveling in an automobile can utilize a GPS sensor to relay data to the predictive model component 1014, wherein the data is subject to the uncertain delay 1024. The predictive model component 1014 can receive the data and the time stamp generator 1016 can stamp such data if desired. The predictive model component 1014 can generate a prediction based at least in part upon data received from the sensor 1022 and the user interface 1018, associate time information with the prediction, and deliver the prediction to the user interface 1018. Due to the delay 1024 associated with relay of data from the user interface 1018 to the predictive model component 1014, the delay 1020 associated with relay of a prediction from the predictive model component 1014 and the user interface 1018, and a change in geographical position associated with the sensor 1022, timing information with respect to predictions is extremely important.

The user interface 1018 can include a time information analyzer 1026 that analyzes time information within data received from the predictive model component 1014 to determine whether the predictive data is outdated. For example, the time information analyzer 1026 can compare a time within predictive data with a current time to determine whether the user interface 1018 should provide a user with predictive data. The user interface 1018 can also be associated with a utility analyzer 1028 that calculates a measure of utility associated with a prediction output by the predictive model component 1014 and received by the user interface 1018. For instance, if the prediction relates to a first geographic region (where a user previously was traveling) and at a current time the user has traveled to a disparate geographic region, the utility analyzer 1028 can determine that the prediction is not currently relevant to the user (as a function of time information and geographic position of the user interface 1018). The user interface 1018 can also be associated with a data store 1030 that can retain data for display to a user. In one example, the user interface 1018 can receive a plurality of predictions that are desirably displayed. The data store 1030 can retain such predictions and the user interfaced 108 can display them at a time dictated by the time information analyzer 1026.

Figure 11:
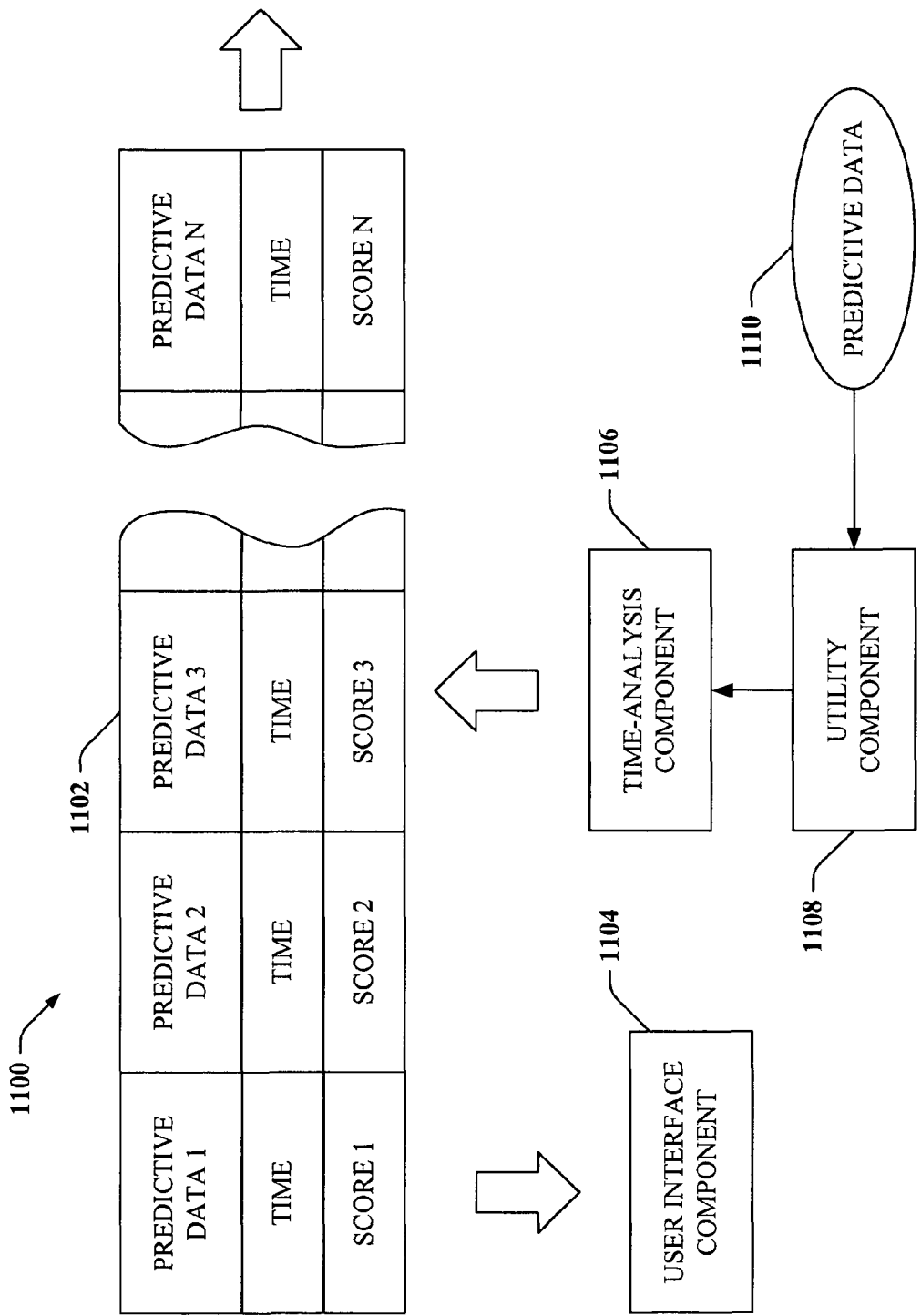
FIG. 11 is an exemplary system that can employ one or more novel aspects of the claimed subject matter.

Now referring to FIG. 11, an exemplary system 1100 that can be utilized in connection with one or more aspects described herein is illustrated. The system 1100 includes a queue 1102 that can be accessed by a user interface component 1104. Predictive data at a first end of the queue 1102 can be output to and/or accessed by a user interface component 1104 for display to a user. In the exemplary system 1100, predictive data 1 can be output to the user interface component 1102. To determine a position of predictive data within the queue, a time analysis component 1106 and a utility component 1108 can operate in conjunction to generate a score associated with predictive data, wherein the score is an indication of relevance of the predictive data to a user. For instance, predictive data 1110 can be received by the utility component 1108, which can determine a measure of utility associated with such predictive data 1110. The time analysis component 1106 can thereafter analyze time information associated with the predictive data 1110 and generate the aforementioned score. The score can then be utilized to determine a position within the queue 1102. As data is added to the queue, predictive data associated with the lowest score can be ousted therefrom. Furthermore, the time analysis component 1106 and the utility component 1108 can monitor the queue to determine whether any of the scores have changed due to sensed contextual data associated with a user (e.g., geographic location) and/or the passing of time. If the scores change, data within the queue can be re-positioned.

Figure 12:
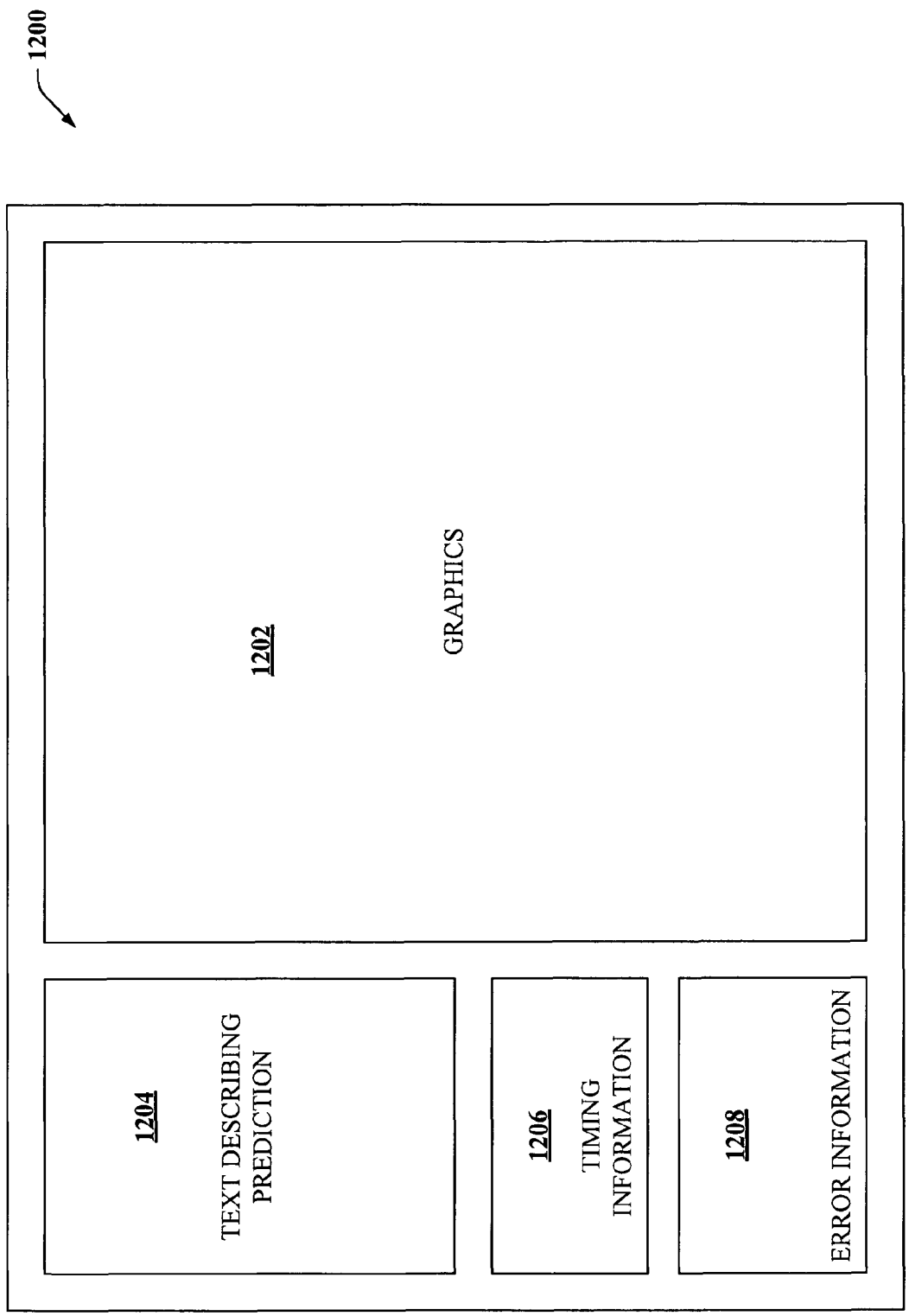
FIG. 12 is an exemplary user interface.

Turning now to FIG. 12, an exemplary user interface 1200 that can be employed to display predictive data to a user is illustrated. The user interface 1200 can include a graphics region 1202 that displays graphics associated with predictive data. For instance, if the predictive data relates to traffic predictions, the graphics region 1202 can display a map of a geographic region associated with a current location of a user and/or a location of a predicted traffic event. The user interface 1202 can further include a text region 1204 that can include text and graphics describing a prediction. Again referring to a traffic example, the text region 1204 can include statements relating to location of a predicted traffic stoppage, predicted cause of stoppage, and the like. The user interface 1200 can further include a region 1206 that describes timing information associated with a prediction. For instance, the region 1206 can include data relating to predicted time of occurrence of a predicted event, current time, etc. The user interface 1200 can further include a region 1208 that displays error information associated with a prediction. For example, the error region can include information relating to an amount of error associated with a predicted event and/or a predicted time. The user interface 1200 thus enables a user to review timing and error information at a substantially similar time.

Figure 13:
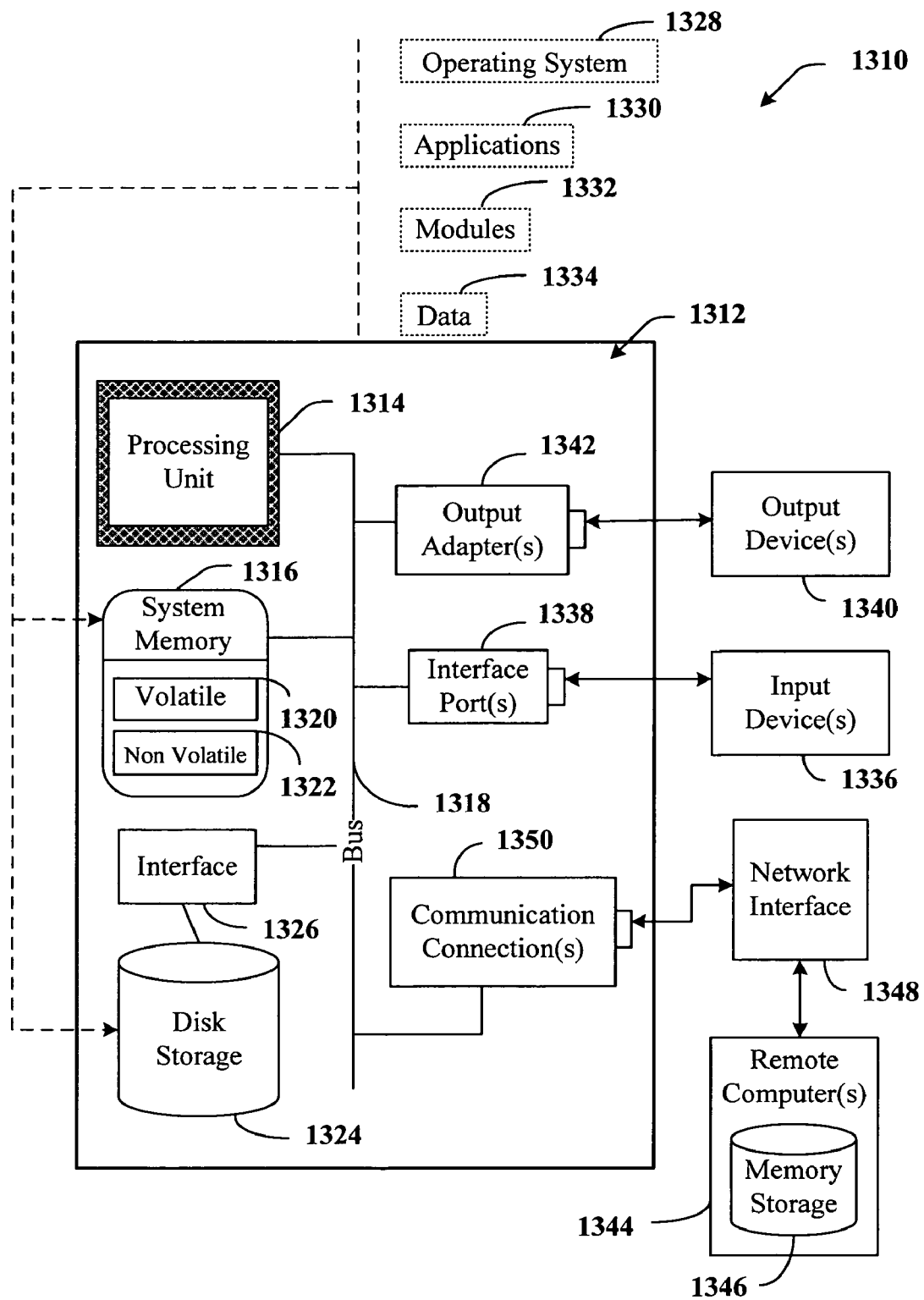
FIG. 13 is a schematic block diagram illustrating a suitable operating environment.

In order to provide additional context for various aspects of the subject invention, FIG. 13 and the following discussion are intended to provide a brief, general description of a suitable operating environment 1310 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1310 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI). The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/nonremovable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
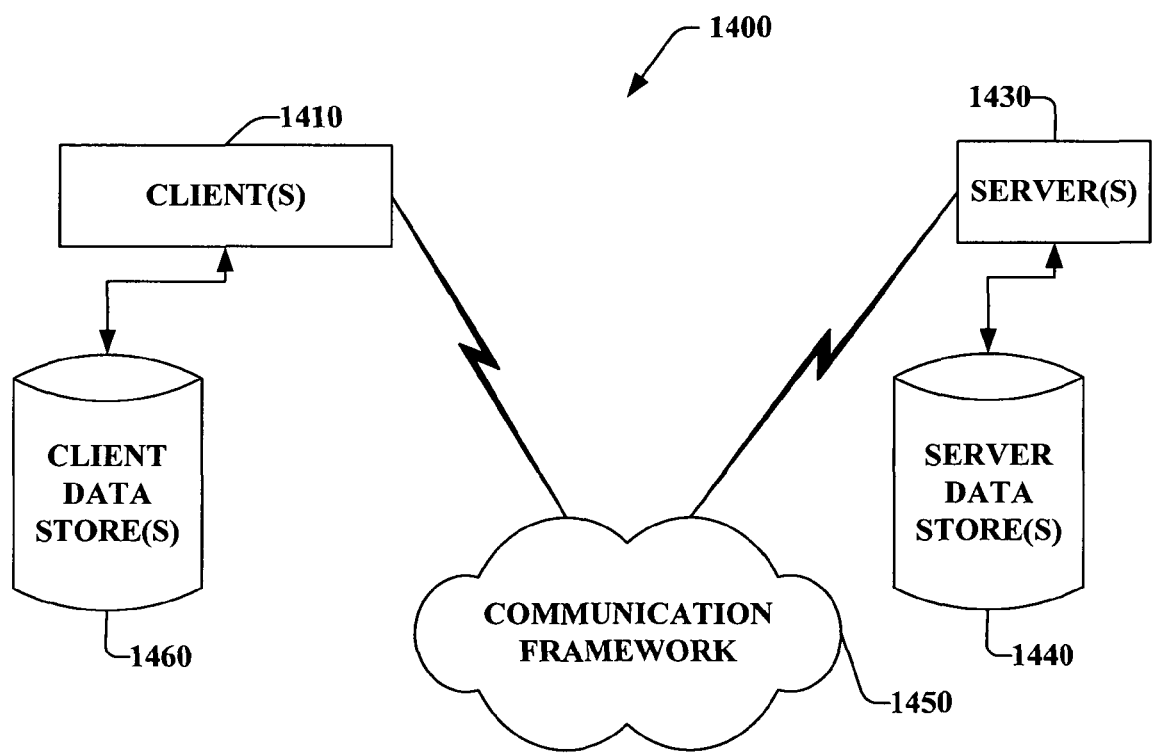
FIG. 14 is a schematic block diagram of a sample-computing environment.

FIG. 14 is a schematic block diagram of a sample-computing environment 1400 with which the subject invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the subject invention, for example. One possible communication between a client 1410 and a server 1430 can be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the claimed subject matter. It is, of course, not possible to describe every conceivable combination of components or methodologies, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates analyzing time-related data, comprising:

at least one processor adapted to implement:

an interface component that receives a packet of information that includes a plurality of predictions and timing information associated therewith, the timing information indicating at least one of a time when sensor data on which a prediction of the plurality of predictions is based was obtained or a predicted time of an event that is predicted within the plurality of predictions; and a time-analysis component communicatively coupled to the interface component that compares the timing information associated with the plurality of predictions with a current time and makes a determination relating to output of at least one of the plurality of predictions based at least in part upon the comparison, the determination indicating that information associated with the prediction is output when the information is relevant at the current time, wherein:
when the timing information indicates a time when sensor data on which the prediction of the plurality of predictions is based was obtained, the determination indicates that information associated with the prediction is not output when the sensor data is out of date at the current time because of a delay in sensor data reaching a component that generated the prediction;
when the timing information indicates a predicted time of an event that is predicted within the plurality of predictions, the determination indicates that information associated with the prediction is output when the predicted time of the event has not passed; and
the plurality of predictions relate to traffic conditions associated with one or more regions of a roadway at a predicted time.

2. The system of claim 1, wherein:
the packet of information further comprises reliability data associated with each of the plurality of predictions; and
the system outputs reliability data together with the at least one prediction.

3. The system of claim 1, wherein:
the time-analysis component makes the determination based on relevance of the one or more regions of the roadway at the predicted time to a user's current travel plans.

4. A portable computing device comprising the system of claim 1.

5. A wristwatch comprising the system of claim 1.

6. The system of claim 1, each of the plurality of predictions within the information packet is associated with disparate points in time in the future.

7. The system of claim 6, further comprising a time-stamp generator that associates the timing information with each of the plurality of predictions.

8. The system of claim 1, the packet of information comprises a lookup table that is utilized by the time-analysis component to make the at least one determination, the lookup table includes one or more of time information associated with a prediction within the packet of information and reliability data associated with a prediction within the packet of information.

9. The system of claim 1, wherein the time-analysis component makes a determination to withhold a prediction from a user if a variance of the timing information associated with the prediction is greater than a threshold.

10. The system of claim 1, the time-analysis component makes a determination relating to where on a screen to display a reliability metric associated with the at least one prediction.

11. The system of claim 1, wherein:
the system further comprises a utility component that calculates a measure of utility in connection with displaying at least a portion of the packet of information; and
the time-analysis component makes the determination based on the measure of utility for the at least the portion of the packet at a time indicated by the timing information associated with the at least the portion of the packet.

12. The system of claim 1, the interface component receives a plurality of packets of information and the time-analysis component selects a subset of the plurality of packets of information to display to a user.

13. The system of claim 1, the time-analysis component is utilized to determine a location within a queue that the packet of information is positioned.

14. A system that facilitates analyzing time-related data, comprising:
at least one processor adapted to implement:
an interface component that receives a packet of information that includes a plurality of predictions and timing information associated therewith, the timing information indicating at least one of a time when sensor data on which a prediction of the plurality of predictions is based was obtained or a predicted time of an event that is predicted within the plurality of predictions; and
a time-analysis component communicatively coupled to the interface component that compares the timing information associated with the plurality of predictions with a current time and makes a determination relating to output of at least one of the plurality of predictions based at least in part upon the comparison, the determination indicating that information associated with the prediction is output when the information is relevant at the current time;

wherein:
the time-analysis component is utilized to determine a location within a queue that the packet of information is positioned, the location being selected based on a score indicating relevance of the packet of information to a user; and
information from packets of information are displayed to the user in an order based on position of the packets of information within the queue; and
the plurality of predictions relate to traffic conditions associated with one or more regions of a roadway at a predicted time.

15. A method for analyzing time-related data, comprising:
with at least one processor:
receiving predictive data with timing information associated with the predictive data, the timing information indicating a time when the predictive data was obtained;
determining a current time;
comparing the current time to the time information associated with the predictive data to determine whether the predictive data is out of date at the current time because of a delay in receipt of the predictive data; and
based at least in part on the comparing indicating that the predictive data is not out of date:
making a prediction based on the predictive data; and
selectively outputting the prediction,
wherein the prediction relates to traffic conditions associated with one or more regions of a roadway.

16. The method of claim 15, further comprising determining a device to which to provide the prediction.

17. The method of claim 15, wherein making the prediction further comprises making a plurality of predictions and associating disparate time information with each prediction within the plurality of predictions, the time information corresponds to future times.

18. The method of claim 15, wherein:

making the prediction further comprises making a plurality of predictions;

determining a probability of correctness associated with the plurality of predictions; and outputting a prediction if the probability of correctness is above a threshold.

19. The method of claim 15, wherein:

making the prediction further comprises making a plurality of predictions;

associating reliability data with each of the plurality of predictions; and graphically presenting reliability data associated with the output prediction to a user.

* * * * *